Inventor:
Henry A. Wayringer,
by His Attorney.

Patented Aug. 25, 1925.

1,551,351

UNITED STATES PATENT OFFICE.

HENRY A. WAYRINGER, OF SCHENECTADY, NEW YORK, ASSIGNOR TO GENERAL ELECTRIC COMPANY, A CORPORATION OF NEW YORK.

PROCESS OF FORMING QUARTZ ARTICLES.

Application filed October 9, 1923. Serial No. 667,590.

*To all whom it may concern:*

Be it known that I, HENRY A. WAYRINGER, a citizen of the United States, residing at Schenectady, in the county of Schenectady, State of New York, have invented certain new and useful Improvements in Processes of Forming Quartz Articles, of which the following is a specification.

The present invention relates to the manufacture of quartz ware, as for example, quartz dishes or crucibles. It is the object of my invention to provide a convenient and expeditious method of forming quartz ware of desired shape.

Heretofore, quartz ware which could not be made by simple extrusion through a die has been laboriously built up from small bits softened by a blow pipe. This process necessarily is expensive and unsuited to quantity production. The high fusing temperature and high heat conductivity of quartz renders exceedingly difficult the molding of fused quartz in the manner that fused glass is molded.

In accordance with my present invention, quartz articles are made by first producing large masses or ingots of vitreous quartz in a substantially homogeneous condition, subdividing the ingot by sawing, or other mechanical method, into plates, or other suitable form, then reheating these quartz plates to a temperature of plasticity and finally shaping the heated preformed plates to a desired form.

Figure 1:
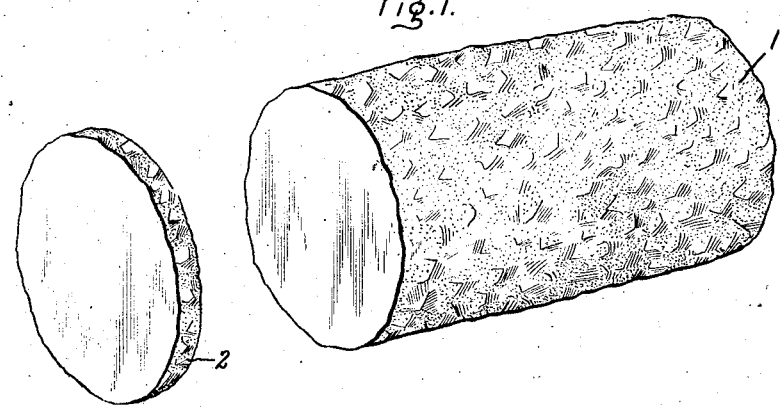
Figure 2:
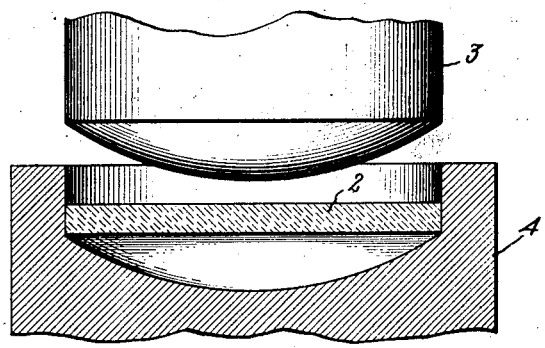

The accompanying drawing shows in Fig. 1 an ingot of fused quartz from which a disc has been cut; Fig. 2 shows a pressure mold and Fig. 3 a finished quartz article.

In carrying out my invention, an ingot 1 of fused quartz, preferably free from bubbles, first is produced by any previously known method. Clear crystal quartz according to the preferred method first is heated to a temperature of coalescence in a vacuum, say, to a temperature of about 1750° C. The resulting fusion which contains numerous evacuated cavities is subjected to pressure while plastic either in the same furnace or more conveniently as a second operation in a pressure furnace, thereby collapsing the evacuated cavities.

The ingot thus obtained, which preferably should have a cross-section equal to the largest cross-section of the desired article, is sliced into plates having a thickness desired in the finished article as indicated at 2. For this purpose I may use a rotating circular cutting plate (not shown) consisting of copper, soft iron or other suitable metal which is charged with an abrasive such as carborundum, or a moving wire charged with a suitable abrasive. The quartz blanks 2 thus obtained are reheated to a temperature of plasticity, and then are molded.

Figure 3:
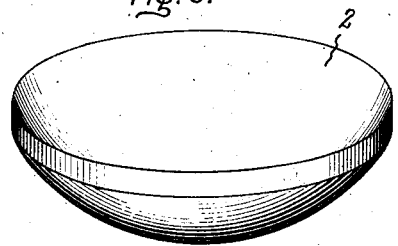

The molding operation may be carried out in its simplest form by heating the blank on top of a mold of desired shape so that as the quartz blank is heated sufficiently to become yielding, say to 1700° C. or thereabouts, it will relax into the mold by its own weight. This method is suitable for the manufacture of simple concaved or dished forms. On the other hand, dies 3, 4 consisting of carbon, or of a suitable refractory metal, such for example, as tungsten, may be used to carry out a molding operation on the preformed blank by means of a mechanically operated plunger. In that case the quartz blank should be heated to a somewhat higher temperature. By the application of moderate pressure articles of regular geometric shape may be made as indicated in Fig. 3.

What I claim as new and desire to secure by Letters Patent of the United States, is:—

1. The method of manufacturing quartz articles which consists in casting fused quartz into the form of a mass having a cross-section substantially equal to the cross-section desired in the finished articles, mechanically subdividing said mass when solidified into sections, re-heating said sections to a temperature of plasticity and molding to a desired form.

2. The method of manufacturing articles from quartz which consists in casting fused quartz in block form, cutting said block into plates after solidification, and shaping said plates when heated to a softening temperature.

3. The method of manufacturing quartz articles of predetermined form which consists in mechanically cutting a plate from an ingot of solid prefused quartz, heating said plate to a temperature of about 1700° C. and then molding said plate to desired form.

4. The method of manufacturing quartz articles of predetermined form which consists in cutting with an abrasive a plate from an ingot of solid, vitreous quartz, and heating said plate in a refractory mold to a temperature high enough to cause said plate to assume the shape of said mold.

In witness whereof, I have hereunto set my hand this 8th day of October, 1923.

HENRY A. WAYRINGER.